United States Patent

Sasaki et al.

Patent Number: 5,859,166
Date of Patent: Jan. 12, 1999

[54] HYDROPHILIC RESIN COMPOSITION

[75] Inventors: Eiji Sasaki; Yasuo Imashiro; Ikuo Takahashi; Naofumi Horie, all of Tokyo, Japan

[73] Assignee: Nisshinbo Industries, Inc., Tokyo, Japan

[21] Appl. No.: 905,022

[22] Filed: Aug. 1, 1997

Related U.S. Application Data

[63] Continuation-in-part of Ser. No. 455,413, May 31, 1995, Pat. No. 5,688,875.

[30] Foreign Application Priority Data

Jun. 10, 1994 [JP] Japan .................................. 6-152632

[51] Int. Cl.⁶ .................................................. C08F 18/34
[52] U.S. Cl. ........................... 528/71; 523/123; 523/124; 523/440; 523/457
[58] Field of Search ..................... 525/123, 124, 525/440, 457; 528/71

[56] References Cited

U.S. PATENT DOCUMENTS 4,966,948 10/1990 Godbey et al. ....................... 525/330.2
5,504,241 4/1996 Pohl et al. ................................ 560/25

*Primary Examiner*—Rachel Gorr
*Attorney, Agent, or Firm*—Kubovcik & Kubovcik

[57] ABSTRACT

The present invention provides a hydrophilic resin composition which is obtained by adding, to a hydrophilic resin selected from a carboxyl group-containing hydrophilic acrylic copolymer resin, a carboxyl group-containing hydrophilic polyester resin and a carboxyl group-containing hydrophilic polyurethane resin, a hydrophilic carbodiimide represented by the following general formula (1):

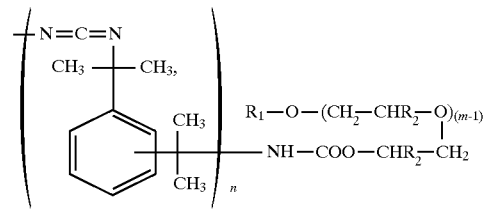

(wherein n is an average polymerization degree and is an integer of 1–30; m is an integer of 4–30; $R_1$ is a lower alkyl group; and $R_2$ is a hydrogen atom or a methyl group) and which has an acid value based on the carboxyl group of the hydrophilic resin, of 10–400 mg KOH/g and a molar ratio of the carbodiimide group to the carboxyl group, of 0.2–5.0.

1 Claim, No Drawings

HYDROPHILIC RESIN COMPOSITION

This application is a continuation-in-part application of U.S. Ser. No. 08/455,413, filed on May 31, 1995, now U.S. Pat. No. 5,688,875.

BACKGROUND OF THE INVENTION

1. Field of the Invention

The present invention relates to a hydrophilic resin composition, and more particularly to a hydrophilic resin composition which has good storage stability at room temperature, which is cured at a relatively low temperature in a short time and which can form a film superior in water resistance, solvent resistance, adhesivity to base material, etc.

2. Description of the Prior Art

Acrylic copolymer resins, polyurethane resins and polyester resins, which are water-soluble, water-dilutable or water-dispersible, are hydrophilic resins and accordingly free from fire hazard and pollution of working environment and, moreover, give a coating film superior in mechanical strengths, flexibility and solvent resistance. Therefore, they are in wide use as a resin component of coating, ink, surface treating agent, coating agent, adhesive, sealing agent, etc. The above resins, however, each contain a large amount of a hydrophilic group for making them water-soluble, water-dilutable or water-dispersible and have been low in water resistance.

In order to solve the above problem, there were made in recent years, attempts of adding to the above hydrophilic resin, a crosslinking agent such as aminoplast resin (e.g. water-soluble melamine resin), epoxy resin, aziridine compound or the like to allow the hydrophilic resin to be able to give a coating film of improved properties (e.g. improved water resistance). In curing the above composition of the hydrophilic resin and the crosslinking agent to obtain a cured film, however, there are disadvantages, for example, a high temperature is required for heating them and the crosslinking agent gives a problem to the working environment.

Meanwhile, there were reported production of an aliphatic polycarbodiimide resin which is cured at a relatively low temperature and which gives a working environment of high safety, and utilization of such a polycarbodiimide resin. For example, in JP-A-59-187029 and JP-B-5-27450 are disclosed an isophorone diisocyanate-derived polycarbodiimide resin and a method for crosslinking a hydrophilic resin using the polycarbodiimide resin.

The above crosslinking of a hydrophilic resin utilizes a reaction between the carbodiimide group of polycarbodiimide and the active hydrogen of active-hydrogen compound. The reaction includes, for example, one between carbodiimide group and a carboxylic acid residue present in hydrophilic acrylic resin.

Conventional aliphatic polycarbodiimides (e.g. a polycarbodiimide derived from isophorone diisocyanate), however, are highly reactive. Therefore, they give rise to a reaction even after their addition to a hydrophilic resin, providing a resin of poor storage stability.

Hydrophilic resins to which a conventional aliphatic polycarbodiimide resin is added, further have a problem in that when they are coated on an olefinic base material such as polypropylene, polyethylene or oriented polypropylene, the resulting film tends to be peeled off.

Further, conventional aliphatic polycarbodiimides, when added to a resin for aqueous coating, etc., must be emulsified beforehand together with a surfactant, mechanically by the use of an expensive high-shear mixer, making complicated the emulsification operation. Moreover, conventional aliphatic polycarbodiimides, when emulsified, inevitably generate urea owing to the reaction with water, making short the storage stability of the emulsion.

OBJECT AND SUMMARY OF THE INVENTION

It is an object of the present invention to overcome the above disadvantages of the prior art and provide a hydrophilic resin composition which has good storage stability at room temperature, which is cured at a relatively low temperature in a short time and which can form a film superior in water resistance, solvent resistance, adhesivity to base material, etc.

According to the present invention there is provided a hydrophilic resin composition which is obtained by adding, to a hydrophilic resin selected from a carboxyl group-containing hydrophilic acrylic copolymer resin, a carboxyl group-containing hydrophilic polyester resin and a carboxyl group-containing hydrophilic polyurethane resin, a hydrophilic carbodiimide represented by the following general formula (1):

(wherein n is an average polymerization degree and is an integer of 1–30; m is an integer of 4–30; $R_1$ is a lower alkyl group; and $R_2$ is a hydrogen atom or a methyl group) and which has an acid value based on the carboxyl group of the hydrophilic resin, of 10–400 mg KOH/g and a molar ratio of the carbodiimide group to the carboxyl group, of 0.2–5.0.

DETAILED DESCRIPTION OF THE INVENTION

The present invention is hereinafter described in detail.

The hydrophilic resin used in the present invention is selected from a carboxyl group-containing hydrophilic acrylic copolymer resin, a carboxyl group-containing hydrophilic polyester resin and a carboxyl group-containing hydrophilic polyurethane resin. These hydrophilic resins can be used singly or in combination of two or more of them.

In the present invention, the hydrophilic resin is required to have an acid value based on the carboxyl group, of 10–400 mg KOH/g, preferably 30–300 mg KOH/g. When the carboxyl group-based acid value is less than 10 mg KOH/g, the hydrophilic resin, when mixed with a hydrophilic carbodiimide (described later), gradually loses miscibility with the carbodiimide and causes thickening, separation, gelation, etc. in some cases. When the carboxyl group-based acid value is more than 400 mg KOH/g, the hydrophilic group tends to remain in the cured coating film and resultantly the film has insufficient water resistance; moreover, the hydrophilic carbodiimide is required in a larger amount, which is uneconomical.

The carboxyl group-containing acrylic copolymer resin includes, for example, acrylic resins obtained by copolymerizing, by emulsion polymerization, solution polymerization, bulk polymerization or the like, a polymerizable unsaturated carboxylic acid (e.g. acrylic acid, itaconic acid, maleic acid, fumaric acid or crotonic acid) or its anhydride with an acrylic acid ester (e.g. methyl acrylate, ethyl acrylate, butyl acrylate, 2-ethylhexyl acrylate or 2-hydroxyethyl acrylate), an acrylic monomer other than acrylic acid (e.g. acrylamide or acrylonitrile) and, as necessary, α-methylstyrene, vinyl acetate, etc.

The carboxylic group-containing polyester resin includes, for example, polyester resins obtained by subjecting a glycol or a hydroxyl-terminated polyester glycol and a tetracarboxylic dianhydride to selective monoesterification for chain extension.

The carboxyl group-containing polyurethane resin includes, for example, polyurethane resins obtained by reacting a carboxyl group-containing urethane type prepolymer obtained from an isocyanate compound and 1) a carboxyl group-containing polyol, 2) a carboxyl group-containing polyol, an amino acid and a polyol, or 3) an amino acid and a polyol, with a basic organic compound and a chain extender in the presence of a solvent or water and then subjecting the reaction mixture to solvent removal under vacuum.

The hydrophilic carbodiimide used in the present invention is represented by the above general formula (1) and is synthesized from (a) an isocyanate-terminated tetramethylxylylenecarbodiimide obtained from, for example, m-tetramethylxylylene diisocyanate

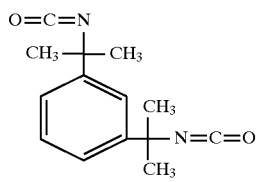

or p-tetramethylxylylene diisocyanate

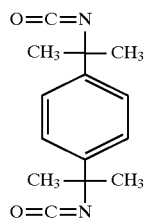

and (b) an organic compound having a hydrophilic segment and at least one functional group reactive with an isocyanate group (said organic compound is hereinafter abbreviated as hydrophilic segment compound).

In the above general formula (1), n is an integer of 1–30 and is an average polymerization degree of the hydrophilic carbodiimide of the present invention. As easily appreciated from the formula, the present carbodiimide has stereoisomers.

The present hydrophilic carbodiimide can be produced specifically by subjecting tetramethylxylylene diisocyanate to a condensation reaction (carbon dioxide removal takes place in the reaction) to synthesize an isocyanate-terminated tetramethylxylylenecarbodiimide and then reacting it with a hydrophilic segment compound.

The above production of isocyanate-terminated tetramethylxylylenecarbodiimide can be conducted basically by conventional processes for production of polycarbodiimide [U.S. Pat. No. 2,941,956; Japanese Patent Publication No. 33279/1972; J. Org. Chem., 28, 2069–2076 (1963); Chemical Review 1981, Vol. 81, No. 4, pp. 619–621].

The above condensation reaction of tetramethylxylylene diisocyanate wherein carbon dioxide removal takes place, proceeds in the presence of a carbodiimidization catalyst. The catalyst includes, for example, 1-phenyl-2-phospholene-1-oxide, 3-methyl-2-phospholene-1-oxide, 1-ethyl-2-phospholene-1-oxide, 1-ethyl-3-methyl-2-phospholene-1-oxide, 3-methyl-1-phenyl-2-phospholene-1-oxide and 3-phospholene isomers thereof. Of these, 3-methyl-1-phenyl-2-phospholene-1-oxide is preferred in view of the reactivity.

The temperature of the above condensation reaction is preferably about 80°–180° C. When the temperature is lower than 80° C., the reaction time is very long. When the temperature is higher than 180° C., side reactions take place, making it difficult to obtain a carbodiimide of good quality.

The condensation degree obtained is preferably 30 or less. A condensation degree higher than 30 results in lower water dispersibility. In order to complete the condensation reaction quickly, the reaction of tetramethylxylylene diisocyanate is conducted in a stream of an inert gas such as nitrogen or the like.

On the other hand, the hydrophilic segment compound is a poly(alkylene oxide) having at least one reactive hydroxyl group, blocked with an alkoxyl group at one end, said poly (alkylene oxide) being represented by the following general formula:

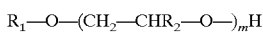

R₁—O—(CH₂—CHR₂—O—)$_m$H (wherein m is an integer of 4–30; $R_1$ is a lower alkyl group of, for example, 1–4 carbon atoms; and $R_2$ is a hydrogen atom or a methyl group). Specific examples of the poly (alkylene oxide) are poly(ethylene oxide) monomethyl ether, poly(ethylene oxide) monoethyl ether, poly(ethylene oxide-propylene oxide) monomethyl ether and poly (ethylene oxide-propylene oxide) monoethyl ether. Poly (ethylene oxide) monomethyl ether is preferred particularly.

When the poly(alkylene oxide) having at least one reactive hydroxyl group, blocked with an alkoxyl group at one end is used as the hydrophilic segment compound, the resulting hydrophilic tetramethylxylylenecarbodiimide used in the present invention has the following molecular structure (1) and is a nonionic type.

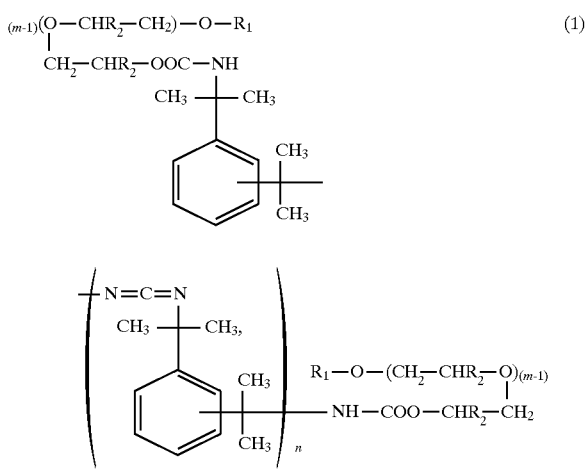

(1)

The above addition reaction between isocyanate-terminated tetramethylxylylenecarbodiimide and hydrophilic segment compound may use a catalyst but proceeds easily only by heating. The reaction temperature can be about 60°–140° C., preferably about 80°–120° C. When the reaction temperature is lower than about 60° C., the reaction time is very long. When the reaction temperature is higher than about 140° C., side reactions take place, making it impossible to obtain a hydrophilic carbodiimide of good quality.

The above-obtained hydrophilic carbodiimide can be added to the hydrophilic resin as it is; however, it is preferably added in the form of an aqueous solution or an aqueous dispersion because it gives easier mixing.

In the present invention, it is necessary that the hydrophilic carbodiimide is added to the hydrophilic resin so that the molar ratio of the carbodiimide group of the hydrophilic carbodiimide to the carboxyl group of the hydrophilic resin becomes 0.2–5.0, preferably 0.3–3.0. When the carbodiimide group/carboxyl group molar ratio is less than 0.2, the carboxyl group (hydrophilic group) remains in the cured coating film formed and no intended water resistance is obtained in some cases. When the carbodiimide group/carboxyl group molar ratio is more than 5.0, the unreacted hydrophilic carbodiimide remains in the cured coating film formed, in a large amount and the film is soft in some cases.

There is no particular restriction as to the method for producing the composition of the present invention, and there can be used a method conventionally used widely in the related field. The present composition can be obtained by appropriately mixing the above-mentioned hydrophilic resin with the above-mentioned hydrophilic carbodiimide and, as necessary, the above-mentioned additive.

The present composition can further comprise, as necessary, a plasticizer, an inorganic or organic filler, a coloring pigment, a dye, a thickening agent, a dispersing agent, an antifoaming agent, an antiseptic agent, an antifungal agent, etc. as long as the object of the present invention is not impaired.

The hydrophilic resin composition of the present invention has also adhesivity to olefin resin, not seen in conventional ordinary hydrophilic resins, although the reason is not clear.

As is clear from the following Examples, the hydrophilic resin composition of the present invention has good storage stability at room temperature, is cured at a relatively low temperature in a short time, and can form a coating film superior in water resistance, solvent resistance, adhesivity to base material (olefin resin in particular), etc.

Therefore, the hydrophilic resin composition of the present invention can be effectively used in various applications such as coating, ink, surface treating agent, coating agent, adhesive, sealing agent and the like.

The present invention is hereinafter described in more detail with reference to Examples.

(Synthesis of hydrophilic carbodiimides)

SYNTHESIS EXAMPLE 1

700 g of m-tetramethylxylylene diisocyanate was reacted with 14 g of a carbodiimidization catalyst (3-methyl-1-phenyl-2-phospholene-1-oxide) at 180° C. for 22 hours to obtain an isocyanate-terminated tetramethylxylylenecarbodiimide (polymerization degree=5). 124.4 g of the carbodiimide was reacted with 63.6 g of poly(oxyethylene) monomethyl ether having a polymerization degree (m) of about 6 at 100° C. for 48 hours. Thereto was slowly added, at 50° C., 282.0 g of distilled water so as to give a resin concentration of 40% by weight, to obtain a yellow transparent carbodiimide solution. The solution, when stored in a constant-temperature chamber of 25° C. for 12 months, showed neither separation nor precipitation and was very stable.

SYNTHESIS EXAMPLE 2

700 g of m-tetramethylxylylene diisocyanate was reacted with 14 g of a carbodiimidization catalyst (3-methyl-1-phenyl-2-phospholene-1-oxide) at 180° C. for 22 hours to obtain an isocyanate-terminated tetramethylxylylenecarbodiimide (polymerization degree=5). 124.4 g of the carbodiimide was reacted with 115.0 g of poly(oxyethylene) monomethyl ether having a polymerization degree (m) of about 12 at 100° C. for 48 hours. Thereto was slowly added, at 50° C., 359.1 g of distilled water so as to give a resin concentration of 40% by weight, to obtain a yellow transparent carbodiimide solution. The solution, when stored in a constant-temperature chamber of 25° C. for 12 months, showed neither separation nor precipitation and was very stable.

SYNTHESIS EXAMPLE 3

700 g of m-tetramethylxylylene diisocyanate was reacted with 14 g of a carbodiimidization catalyst (3-methyl-1-phenyl-2-phospholene-1-oxide) at 180° C. for 32 hours to obtain an isocyanate-terminated tetramethylxylylenecarbodiimide (polymerization degree=10). 224.4 g of the carbodiimide was reacted with 63.6 g of poly(oxyethylene) monomethyl ether having a polymerization degree (m) of about 6 at 100° C. for 48 hours. Thereto was slowly added, at 50° C., 432 g of distilled water so as to give a resin concentration of 40% by weight, to obtain an emulsion-like carbodiimide solution. The solution, when stored in a constant-temperature chamber of 25° C. for 12 months, showed neither separation nor precipitation and was very stable.

SYNTHESIS EXAMPLE 4

700 g of m-tetramethylxylylene diisocyanate was reacted with 14 g of a carbodiimidization catalyst (3-methyl-1-phenyl-2-phospholene-1-oxide) at 180° C. for 32 hours to obtain an isocyanate-terminated tetramethylxylylenecarbodiimide (polymerization degree=10). 224.4 g of the carbodiimide was reacted with 82.6 g of poly(oxyethylene) monomethylether having a polymerization degree (m) of about 8 at 100° C. for 48 hours. Thereto was slowly added, at 50° C., 716.3 g of distilled water so as to give a resin concentration of 30% by weight, to obtain an emulsion-like carbodiimide solution. The solution, when stored in a constant-temperature chamber of 25° C. for 12 months, showed neither separation nor precipitation and was very stable.

SYNTHESIS EXAMPLE 5

700 g of m-tetramethylxylylene diisocyanate was reacted with 14 g of a carbodiimidization catalyst (3-methyl-1-phenyl-2-phospholene-1-oxide) at 180° C. for 32 hours to obtain an isocyanate-terminated tetramethylxylylenecarbodiimide (polymerization degree=10). 224.4 g of the carbodiimide was reacted with 115.0 g of poly(oxyethylene) monomethyl ether having a polymerization degree (m) of about 12 at 100° C. for 48 hours. Thereto was slowly added, at 50° C., 509.1 g of distilled water so as to give a resin concentration of 40% by weight, to obtain a yellow transparent carbodiimide solution. The solution, when stored in a constant-temperature chamber of 25° C. for 12 months, showed neither separation nor precipitation and was very stable.

SYNTHESIS EXAMPLE 6

700 g of m-tetramethylxylylene diisocyanate was reacted with 14 g of a carbodiimidization catalyst (3-methyl-1-phenyl-2-phospholene-1-oxide) at 180° C. for 58 hours to obtain an isocyanate-terminated tetramethylxylylenecarbodiimide (polymerization degree=15). 324.4 g of the carbodiimide was reacted with 115.0 g of poly(oxyethylene)

monomethyl ether having a polymerization degree (m) of about 12 at 100° C. for 48 hours. Thereto was slowly added, at 50° C., 659.1 g of distilled water so as to give a resin concentration of 40% by weight, to obtain an emulsion-like carbodiimide solution. The solution, when stored in a constant-temperature chamber of 25° C. for 12 months, showed neither separation nor precipitation and was very stable.

SYNTHESIS EXAMPLE 7

700 g of m-tetramethylxylylene diisocyanate was reacted with 14 g of a carbodiimidization catalyst (3-methyl-1-phenyl-2-pholene-1-oxide) at 180° C. for 58 hours to obtain an isocyanate-terminated tetramethylxylylenecarbodiimide (polymerization degree 15). 324.4 g of the carbodiimide was reacted with 160.2 g of poly(oxyethylene) monomethyl ether having a polymerization degree (m) of about 18 at 100° C. for 48 hours. Thereto was slowly added, at 50° C., 726.9 g of distilled water so as to give a resin concentration of 40% by weight, to obtain a yellow transparent carbodiimide solution. The solution, when stored in a constant-temperature chamber of 25° C. for 12 months, showed neither separation nor precipitation and was very stable.

SYNTHESIS EXAMPLE 8

700 g of isophorone diisocyanate was reacted with 14 g of a carbodiimidization catalyst (3-methyl-1-phenyl-2-phospholene-1-oxide) at 180° C. for 8 hours to obtain an isocyanate-terminated isophoronecarbodiimide (polymerization degree=5). 111.2 g of the carbodiimide was reacted with 63.6 g of poly(oxyethylene) monomethyl ether having a polymerization degree (m) of about 6 at 100° C. for 24 hours. Thereto was slowly added, at 50° C., 262.2 g of distilled water so as to give a resin concentration of 40% by weight, to obtain a yellow transparent carbodiimide solution. The solution, when stored in a constant-temperature chamber of 25° C., became cloudy and showed separation in 4 months.

SYNTHESIS EXAMPLE 9

700 g of isophorone diisocyanate was reacted with 14 g of a carbodiimidization catalyst (3-methyl-1-phenyl-2-phospholene-1-oxide) at 180° C. for 14 hours to obtain an isocyanate-terminated isophoronecarbodiimide (polymerization degree=10). 200.2 g of the carbodiimide was reacted with 82.6 g of poly(oxyethylene) monomethyl ether having a polymerization degree (m) of about 8 at 100° C. for 48 hours. Thereto was slowly added, at 50° C., 660 g of distilled water so as to give a resin concentration of 30% by weight, to obtain an emulsion-like carbodiimide solution. The solution, when stored in a constant-temperature chamber of 25° C., showed separation in 2 months.

SYNTHESIS EXAMPLE 10

700 g of isophorone diisocyanate was reacted with 14 g of a carbodiimidization catalyst (3-methyl-1-phenyl-2-phospholene-1-oxide) at 180° C. for 14 hours to obtain an isocyanate-terminated isophoronecarbodiimide (polymerization degree=10). 200.2 g of the carbodiimide was reacted with 115.0 g of poly(oxyethylene) monomethyl ether having a polymerization degree (m) of about 12 at 100° C. for 24 hours. Thereto was slowly added, at 50° C., 472.8 g of distilled water so as to give a resin concentration of 40% by weight, to obtain a yellow transparent carbodiimide solution. The solution, when stored in a constant-temperature chamber of 25° C., became cloudy and showed separation in 4 months.

SYNTHESIS EXAMPLE 11

(Production of aqueous acrylic copolymer resin solution)

150 parts by weight of isopropyl alcohol was fed into a four-necked flask provided with a stirrer, a reflux condenser, a temperature-controlling means and a nitrogen inlet tube, and was heated to 83° C. and kept at that temperature. Thereto were dropwise added, in 2 hours, a mixture of 8 parts by weight of acrylic acid, 30 parts by weight of tert-butyl acrylate, 36 parts by weight of n-butyl acrylate and 22 parts by weight of polyethylene glycol methacrylate, and 80 parts by weight of an azobisbutyronitrile/isopropyl alcohol (1/20) solution. The resulting mixture was subjected to a reaction for 3 hours in a refluxing state. Thereto were added 6.7 parts by weight of 28% ammonia water and 250 parts by weight of water. The resulting mixture was subjected to azeotropic distillation to remove the total amount of isopropyl alcohol, to obtain an aqueous acrylic copolymer resin solution having a resin solid content of 30% and an acid value of 62 mg KOH/g.

SYNTHESIS EXAMPLE 12

(Production of aqueous polyester resin dispersion)

Into a reactor provided with a stirrer, a rectification column, a temperature-controlling means and a nitrogen inlet tube were fed 29.6 parts by weight of dimethyl-5-sulfoisophthalate sodium salt, 155.2 parts by weight of dimethyl terephthalate, 86.8 parts by weight of ethylene glycol, 104 parts by weight of neopentyl glycol and 0.1 part by weight of zinc acetate. They were subjected to an ester exchange reaction at 160°–220° C. for 8 hours. Thereto was added 182.6 parts by weight of isophthalic acid. The resulting mixture was subjected to a reaction at 190°–240° C. for 10 hours with water being removed, to obtain a polyester glycol having a molecular weight of 1,600 and a hydroxyl value of 70 mg KOH/g. Into the same reactor as used above were fed 100 parts by weight of the above-obtained polyester glycol and 14 parts by weight of pyromellitic anhydride. The resulting mixture was subjected to a reaction at 170° C. for 3 hours to obtain a carboxyl group-containing polyester resin having an average molecular weight of 12,000 and an acid value of 63.2 mg KOH/g.

80 parts by weight of the carboxyl group-containing polyester resin and 120 parts by weight of methyl ethyl ketone were fed into a reactor and stirred at 70° C. for 3 hours to obtain a uniform viscous solution. The solution was stirred vigorously, and thereto was slowly added a mixture of 5.5 parts by weight of 28% ammonia and 294.5 parts by weight of water. The resulting mixture was subjected to azeotropic distillation to remove the total amount of methyl ethyl ketone to obtain an aqueous polyester resin dispersion having a resin solid content of 30%.

SYNTHESIS EXAMPLE 13

(Production of aqueous polyurethane resin solution)

Into a reactor provided with a stirrer, a rectification column, a temperature-controlling means and a nitrogen inlet tube were fed 146.1 parts by weight of a polycaprolactone having a molecular weight of 2,000, 29.3 parts by weight of dimethylolpropionic acid and 150 parts by weight of methyl ethyl ketone. They were heated to 50° C. in a nitrogen atmosphere and made into a solution. Thereto was added 97.3 parts by weight of isophorone diisocyanate, and the mixture was heated to 80°–90° C. to conduct a reaction for 4 hours. The reaction mixture was cooled and diluted with 100 parts by weight of acetone to obtain a prepolymer. 522.7 parts by weight of the prepolymer was dropwise added to a system kept at 30° C., consisting of 3.2 parts by weight of dibutylamine, 24.1 parts by weight of isophoronediamine and a mixed solvent of 220 parts by weight of acetone and 50 parts by weight of water, to give rise to a reaction, whereby a polyurethane resin solution was obtained.

To the polyurethane resin solution was added 465 parts by weight of a deionized water containing 2.7 parts by weight of 28% ammonia water, to conduct neutralization. The reaction mixture was subjected to solvent (methyl ethyl ketone and acetone) removal to obtain an aqueous polyurethane solution having a non-volatile content of 30.0% and an acid value of 41 mg KOH/g.

EXAMPLES 1–7

The aqueous acrylic copolymer resin solution obtained in Synthesis Example 11 was mixed with one of the carbodiimide solutions obtained as a crosslinking agent in Synthesis Examples 1–7 so that the carboxyl group of the resin solution and the carbodiimide group of the carbodiimide solution became equivalent to each other, whereby aqueous resin compositions were produced. Each composition was measured for viscosity change at 25° C.

COMPARATIVE EXAMPLES 1–5

Aqueous resin compositions were produced and measured for viscosity change in the same manner as in Examples 1–7 except that there was used, as the crosslinking agent, one of the carbodiimide solutions obtained in Synthesis Examples 8–10, a commercial epoxy type crosslinking agent or a commercial aziridine type crosslinking agent. The amount of the crosslinking agent used was such that the carboxyl group of the acrylic copolymer resin solution became equivalent to the carbodiimide group of the carbodiimide solution or the epoxy group of the epoxy type crosslinking agent or the aziridine group of the aziridine type crosslinking agent.

The test results of Examples 1–7 and Comparative Examples 1–5 are shown in Table 1.

ammonia water resistance, methanol resistance and adhesivity according to the following test methods.

[Test method for aqueous ammonia water resistance or methanol resistance]

An aqueous resin composition was coated on a polyethylene terephthalate film by the use of a bar coater so as to give a film thickness of 30–40 $\mu$m. The resulting film was dried at 80° C. for 15 minutes to obtain a cured film. The cured film was rubbed with an absorbent cotton impregnated with 5% ammonia water or methanol, to measure the times of rubbing up to color migration (migration of the blue color of the film to the cotton). When no color migration took place even by rubbing of 100 times or more, the aqueous ammonia water resistance or methanol resistance of the composition was reported as 100 times.

[Test method for adhesivity]

An aqueous resin composition was coated on a SUS-304 stainless steel panel by the use of a bar coater so as to give a film thickness of 30–40 $\mu$m. The resulting film was dried at 80° C. for 15 minutes to obtain a cured film. 100 squares per $cm^2$ were formed in the cured film according to JIS K 5400. A cellophane tape was adhered onto the cured film, pressed sufficiently and quickly peeled off. The condition of squares after peeling was observed and the adhesivity of the cured film was rated according to the following standard shown in Table 2.

TABLE 2

| Point of rating | Condition of squares |
| --- | --- |
| 10 | No square was peeled. |
| 8 | The area of peeled squares is less than 5% of the area of total |

TABLE 1

| | Crosslinking agent | Amount of crosslinking agent (parts by weight) | Amount of acrylic resin (parts by weight) | Viscosity right after mixing (cp) | Viscosity after 3 days (cp) | Viscosity after 1 week (cp) |
| --- | --- | --- | --- | --- | --- | --- |
| Examples | | | | | | |
| 1 | Synthesis Example 1 | 7.7 | 30 | 82 | 96 | 132 |
| 2 | Synthesis Example 2 | 11.8 | 30 | 81 | 100 | 137 |
| 3 | Synthesis Example 3 | 7.1 | 30 | 90 | 101 | 128 |
| 4 | Synthesis Example 4 | 10.0 | 30 | 87 | 94 | 131 |
| 5 | Synthesis Example 5 | 8.9 | 30 | 85 | 98 | 120 |
| 6 | Synthesis Example 6 | 7.3 | 30 | 95 | 108 | 150 |
| 7 | Synthesis Example 7 | 8.1 | 30 | 92 | 104 | 144 |
| Comparative Examples | | | | | | |
| 1 | Synthesis Example 8 | 8.5 | 30 | 107 | 455 | Gelation |
| 2 | Synthesis Example 9 | 9.2 | 30 | 110 | 438 | Gelation |
| 3 | Synthesis Example 10 | 7.8 | 30 | 105 | 491 | Gelation |
| 4 | Epoxy type[*1] | 1.0 | 30 | 98 | 518 | Gelation |
| 5 | Aziridine type[*2] | 1.4 | 30 | 106 | 679 | Gelation |

[*1]Denacol EX-614B (a product of Nagase Chemicals Ltd., solid content = 100%, epoxy equivalent = 102)
[*2]Chemitight PZ-33 (a product of Nippon Shokubai Co., Ltd., solid content = 100%, aziridine equivalent = 142)

EXAMPLES 8–30

One of the aqueous resin solutions obtained in Synthesis Examples 11–13 was mixed with a crosslinking agent (one of the aqueous carbodiimide solutions obtained in Synthesis Examples 1–7), in a formulation shown in Table 3. To the resulting mixture was added 0.1 part of a blue pigment, followed by thorough mixing, to obtain various aqueous resin compositions. Using the aqueous resin compositions, cured coating films were formed and measured for aqueous TABLE 2-continued

| Point of rating | Condition of squares |
| --- | --- |
| | squares. |
| 6 | The area of peeled squares is 5% to less than 15% of the area of total squares. |
| 4 | The area of peeled squares is 15% to |

TABLE 2-continued

| Point of rating | Condition of squares |
|---|---|
|  | less than 35% of the area of total squares. |
| 2 | The area of peeled squares is 35% to less than 65% of the area of total squares. |
| 0 | The area of peeled squares is 65% or more of the area of total squares. |

COMPARATIVE EXAMPLES 6–23

One of the aqueous resin solutions obtained in Synthesis Examples 11–13 was mixed with a crosslinking agent (one of the aqueous carbodiimide solutions obtained in Synthesis Examples 8–10 or an epoxy type crosslinking agent or an aziridine type crosslinking agent), in a formulation shown in Table 2. To the resulting mixture was added 0.1 part of a blue pigment, followed by thorough mixing, to obtain various aqueous resin compositions. Using the aqueous resin compositions, cured coating films were formed and measured for aqueous ammonia water resistance, methanol resistance and adhesivity in the same manners as in Examples 8–28. The same test was conducted also for a case using no crosslinking agent.

The results of the above test are shown in Table 3.

TABLE 3-1

| | Formulation | | | | | | | | | | | | | | | Properties | | | |
|---|---|---|---|---|---|---|---|---|---|---|---|---|---|---|---|---|---|---|---|
| | Hydrophilic resin | | | Crosslinking agent | | | | | | | | | | | | Ammonia | Methanol | | (Carbodiimide |
| | Synthesis Examples | | | Synthesis Examples | | | | | | | | | | E-poxy | Aziridine | water resis- | nol resis- | Adhesi- | group)/ (carboxyl |
| Examples | 11 | 12 | 13 | 1 | 2 | 3 | 4 | 5 | 6 | 7 | 8 | 9 | 10 | type | type | tance | tance | vity | group) |
| 8 | 50.0 | | | 13.3 | | | | | | | | | | | | 98 | 89 | 10 | 1.0 |
| 9 | 50.0 | | | | 19.8 | | | | | | | | | | | 100 | 95 | 10 | 1.0 |
| 10 | 50.0 | | | | | 11.8 | | | | | | | | | | 100 | 100 | 10 | 1.0 |
| 11 | 50.0 | | | | | | 16.7 | | | | | | | | | 100 | 91 | 10 | 1.0 |
| 12 | 50.0 | | | | | | | 14.8 | | | | | | | | 100 | 100 | 10 | 1.0 |
| 13 | 50.0 | | | | | | | | 12.1 | | | | | | | 100 | 100 | 10 | 1.0 |
| 14 | 50.0 | | | | | | | | | 13.6 | | | | | | 100 | 100 | 10 | 1.0 |
| 15 | 50.0 | | | | | | | | 6.1 | | | | | | | 93 | 78 | 8 | 0.5 |
| 16 | 50.0 | | | | | | | | 24.2 | | | | | | | 92 | 85 | 10 | 2.0 |
| 17 | | 40.0 | | 10.4 | | | | | | | | | | | | 92 | 52 | 10 | 1.0 |
| 18 | | 40.0 | | | 12.8 | | | | | | | | | | | 85 | 48 | 10 | 0.8 |
| 19 | | 40.0 | | | | 14.4 | | | | | | | | | | 100 | 61 | 10 | 1.5 |
| 20 | | 40.0 | | | | | 13.6 | | | | | | | | | 100 | 50 | 10 | 1.0 |
| 21 | | 40.0 | | | | | | 12.1 | | | | | | | | 100 | 58 | 10 | 1.0 |
| 22 | | 40.0 | | | | | | | 3.0 | | | | | | | 70 | 38 | 8 | 0.3 |
| 23 | | 40.0 | | | | | | | | 13.3 | | | | | | 100 | 65 | 10 | 1.2 |
| 24 | | | 50.0 | 6.0 | | | | | | | | | | | | 100 | 78 | 10 | 0.8 |
| 25 | | | 50.0 | | 11.6 | | | | | | | | | | | 100 | 83 | 10 | 1.0 |
| 26 | | | 50.0 | | | 13.9 | | | | | | | | | | 95 | 63 | 10 | 2.0 |
| 27 | | | 50.0 | | | | 14.1 | | | | | | | | | 100 | 77 | 10 | 0.7 |
| 28 | | | 50.0 | | | | | 13.1 | | | | | | | | 100 | 81 | 10 | 1.5 |
| 29 | | | 50.0 | | | | | | 7.1 | | | | | | | 90 | 60 | 8 | 1.0 |
| 30 | | | 50.0 | | | | | | | 8.0 | | | | | | 100 | 90 | 10 | 1.0 |

TABLE 3-2

| | Formulation | | | | | | | | | | | | | | | Properties | | | |
|---|---|---|---|---|---|---|---|---|---|---|---|---|---|---|---|---|---|---|---|
| | Hydrophilic resin | | | Crosslinking agent | | | | | | | | | | | | Ammonia | Methanol | | (Carbodiimide |
| | Synthesis Examples | | | Synthesis Examples | | | | | | | | | | E-poxy | Aziridine | water resis- | nol resis- | Adhesi- | group)/ (carboxyl |
| Comparative Examples | 11 | 12 | 13 | 1 | 2 | 3 | 4 | 5 | 6 | 7 | 8 | 9 | 10 | type | type | tance | tance | vity | group) |
| 6 | 50.0 | | | | | | | | | | | | | | | 3 | 3 | 2 | 0 |
| 7 | 50.0 | | | | | | | | | | 14.2 | | | | | 58 | 61 | 8 | 1.0 |
| 8 | 50.0 | | | | | | | | | | | 15.4 | | | | 63 | 70 | 8 | 1.0 |
| 9 | 50.0 | | | | | | | | | | | | 13.0 | | | 52 | 58 | 8 | 1.0 |
| 10 | 50.0 | | | | | | | | | | | | | 1.7 | | 15 | 5 | 4 | 1.0 |
| 11 | 50.0 | | | | | | | | | | | | | | 2.4 | 80 | 75 | 4 | 1.0 |
| 12 | | 40.0 | | | | | | | | | | | | | | 18 | 12 | 4 | 0 |
| 13 | | 40.0 | | | | | | | | | 11.6 | | | | | 56 | 16 | 8 | 1.0 |

TABLE 3-2-continued

| | Formulation | | | | | | | | | | | | | | | Properties | | | |
|---|---|---|---|---|---|---|---|---|---|---|---|---|---|---|---|---|---|---|---|
| | Hydrophilic resin | | | Crosslinking agent | | | | | | | | | | | | Ammonia | Metha- | | (Carbodiimide |
| | Synthesis Examples | | | Synthesis Examples | | | | | | | | | | E-poxy type | Aziridine type | water resis- | nol resis- | Adhesi- | group)/ (carboxyl |
| Comparative Examples | 11 | 12 | 13 | 1 | 2 | 3 | 4 | 5 | 6 | 7 | 8 | 9 | 10 | | | tance | tance | vity | group) |
| 14 | | 40.0 | | | | | | | | | | 12.5 | | | | 45 | 15 | 8 | 1.0 |
| 15 | | 40.0 | | | | | | | | | | | 10.6 | | | 67 | 25 | 8 | 1.0 |
| 16 | | 40.0 | | | | | | | | | | | | 1.4 | | 48 | 15 | 6 | 1.0 |
| 17 | | 40.0 | | | | | | | | | | | | | 1.9 | 82 | 43 | 6 | 1.0 |
| 18 | | | 50.0 | | | | | | | | | | | | | 52 | 21 | 4 | 0 |
| 19 | | | 50.0 | | | | | | | 8.4 | | | | | | 88 | 42 | 8 | 1.0 |
| 20 | | | 50.0 | | | | | | | | | 9.1 | | | | 93 | 39 | 8 | 1.0 |
| 21 | | | 50.0 | | | | | | | | | | 7.6 | | | 86 | 47 | 8 | 1.0 |
| 22 | | | 50.0 | | | | | | | | | | | 1.0 | | 80 | 38 | 6 | 1.0 |
| 23 | | | 50.0 | | | | | | | | | | | | 1.4 | 87 | 45 | 8 | 1.0 |

EXAMPLES 29–35

Adhesivity was measured in the same manner as in Examples 6–12 except that the base material was changed from the SUS-304 stainless steel panel to a polyethylene terephthalate film, a polyethylene film or a oriented polypropylene film (each had a thickness of 50 μm). The results are shown in Table 4.

COMPARATIVE EXAMPLES 24–29

Adhesivity was measured in the same manner as in Comparative Examples 6–11 except that the base material was changed from the SUS-304 stainless steel panel to a polyethylene terephthalate film, a polyethylene film or a oriented polypropylene film (each had a thickness of 50 μm). The results are shown in Table 4.

What is claimed is:

1. A hydrophilic resin composition which is obtained by adding, to a hydrophilic resin selected from a carboxyl group-containing hydrophilic acrylic copolymer resin, a carboxyl group-containing hydrophilic polyester resin and a carboxyl group-containing hydrophilic polyurethane resin, a hydrophilic carbodiimide represented by the following general formula (1):

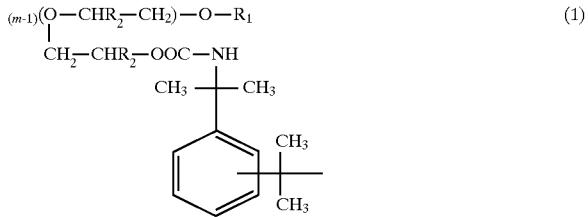

TABLE 4

| | Formulation of resin composition | Number of NCN groups/number of COOH groups | Adhesivity to base material | | | |
|---|---|---|---|---|---|---|
| | | | SUS-304 | PET | PE | Oriented PP |
| Example 29 | Same as Example 6 | 1.0 | 10 | 10 | 8 | 8 |
| Example 30 | Same as Example 7 | 1.0 | 10 | 10 | 8 | 8 |
| Example 31 | Same as Example 8 | 1.0 | 10 | 10 | 8–10 | 8–10 |
| Example 32 | Same as Example 9 | 1.0 | 10 | 10 | 8–10 | 8–10 |
| Example 33 | Same as Example 10 | 1.0 | 10 | 10 | 8–10 | 8–10 |
| Example 34 | Same as Example 11 | 1.0 | 10 | 10 | 8–10 | 8–10 |
| Example 35 | Same as Example 12 | 1.0 | 10 | 10 | 8–10 | 8–10 |
| Comparative Example 24 | Same as Comparative Example 6 | 1.0 | 2 | 10 | * | * |
| Comparative Example 25 | Same as Comparative Example 7 | 1.0 | 8 | 10 | 0 | 0 |
| Comparative Example 26 | Same as Comparative Example 8 | 1.0 | 8 | 10 | 2 | 2 |
| Comparative Example 27 | Same as Comparative Example 9 | 1.0 | 8 | 10 | 2 | 2 |
| Comparative Example 28 | Same as Comparative Example 10 | — | 4 | 10 | * | * |
| Comparative Example 29 | Same as Comparative Example 11 | — | 4 | 10 | * | * |

*Unable to measure because the film formed by coating a hydrophilic resin composition on a base material caused peeling from the base material when dried and cured.

-continued
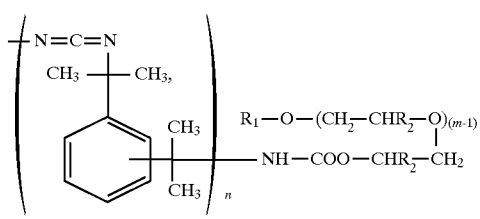
(wherein n is an average polymerization degree and is an integer of 1–30; m is an integer of 4–30; $R_1$ is a lower alkyl group; and $R_2$ is a hydrogen atom or a methyl group) and which has an acid value based on the carboxyl group of the hydrophilic resin, of 10–400 mg KOH/g and a molar ratio of the carbodiimide group to the carboxyl group, of 0.2–5.0.
* * * * *